US010923750B2

(12) United States Patent
Cingoz et al.

(10) Patent No.: US 10,923,750 B2
(45) Date of Patent: Feb. 16, 2021

(54) DC VOLTAGE BROWNOUT PROTECTION FOR PARALLEL-CONNECTED FUEL-CELL POWER PLANTS IN ISLANDED MODE

(71) Applicant: DOOSAN FUEL CELL AMERICA, INC., South Windsor, CT (US)

(72) Inventors: Fatih Cingoz, East Hartford, CT (US); David Reale, Southwick, MA (US)

(73) Assignee: DOOSAN FUEL CELL AMERICA, INC., South Windsor, CT (US)

( * ) Notice: Subject to any disclaimer, the term of this patent is extended or adjusted under 35 U.S.C. 154(b) by 190 days.

(21) Appl. No.: 16/275,814

(22) Filed: Feb. 14, 2019

(65) Prior Publication Data

US 2020/0266462 A1 Aug. 20, 2020

(51) Int. Cl.
| | |
|---|---|
| *H02J 1/10* | (2006.01) |
| *H01M 8/04828* | (2016.01) |
| *H01M 8/04664* | (2016.01) |
| *H01M 8/04537* | (2016.01) |
| *H02J 3/30* | (2006.01) |
| *H02J 7/00* | (2006.01) |

(52) U.S. Cl.
CPC ..... *H01M 8/0494* (2013.01); *H01M 8/04559* (2013.01); *H01M 8/04679* (2013.01); *H02J 1/10* (2013.01); *H01M 2250/10* (2013.01); *H02J 7/00302* (2020.01); *H02J 7/00306* (2020.01); *H02J 2300/30* (2020.01)

(58) Field of Classification Search
None
See application file for complete search history.

(56) References Cited

U.S. PATENT DOCUMENTS

| 7,228,206 B2 * | 6/2007 | Kahle ..................... H02P 9/305 |
| | | 701/1 |
| 7,304,462 B2 | 12/2007 | Shvarts |
| | | (Continued) |

FOREIGN PATENT DOCUMENTS

WO WO2018156647 * 8/2018

OTHER PUBLICATIONS

Khaledian, et al.; Analysis of droop control method in an autonomous microgrid; Journal of Applied Research and Technology 15 (2017) 371-377.
Lopes, et al.; Defining Control Strategies for MicroGrids Islanded Operation; IEEE Transactions on Power Systems, vol. 21, No. 2, May 2006, 916-924.
Deng, et al.; Distributed Variable Droop Curve Control Strategies, Energies 2018, 11, 24; doi:10.3390/en11010024; www.mdpi.com/journal;energies; 17 pages.
(Continued)

*Primary Examiner* — Kaity V Chandler
(74) *Attorney, Agent, or Firm* — Carlson, Gaskey & Olds

(57) ABSTRACT

An illustrative example fuel cell power plant includes a cell stack assembly, a single stage convertor configured to couple the cell stack assembly to a power network, and a controller that is configured to determine whether the fuel cell power plant has a DC voltage brownout condition during an islanded mode of operation. The controller dynamically adjusts the frequency droop gain of the power plant using an offset while satisfying at least three criteria of a set of criteria consisting of (i) avoiding overloading other fuel cell power plants of the power network, (ii) avoiding exceeding a maximum load step-up capability of the power network, (iii) avoiding exceeding a maximum load step-up capability of the fuel cell power plant, (iv) maintaining a system frequency within an acceptable frequency range, and (v) avoiding repeating the DC voltage brownout condition.

15 Claims, 3 Drawing Sheets

(56) References Cited

U.S. PATENT DOCUMENTS

| | | | | |
|---|---|---|---|---|
| 7,579,714 B2* | 8/2009 | Okui | ............... | H02J 9/062 |
| | | | | 307/64 |
| 9,450,452 B2* | 9/2016 | Harris | ............... | H02M 3/33515 |
| 9,800,052 B2* | 10/2017 | Li | ............... | H02J 3/382 |
| 2004/0207266 A1* | 10/2004 | Abel | ............... | H02J 9/066 |
| | | | | 307/80 |
| 2006/0227577 A1* | 10/2006 | Horiuchi | ............... | H02M 3/33523 |
| | | | | 363/21.02 |
| 2011/0187197 A1 | 8/2011 | Moth | | |
| 2014/0091631 A1 | 4/2014 | Naden et al. | | |
| 2015/0357820 A1* | 12/2015 | Sugimoto | ............... | H01M 10/48 |
| | | | | 307/52 |
| 2017/0316135 A1* | 11/2017 | Johnson | ............... | G01R 35/04 |
| 2018/0006580 A1* | 1/2018 | Lung | ............... | H02M 5/04 |

OTHER PUBLICATIONS

He, et al.; Dynamic Virtual Resistance Droop Control Scheme for Distributed Generation System; Telkomnika, vol. 11, No. 3, Mar. 2013, pp. 1134-1141, ISSN: 2302-4046.

Barklund, et al.; Energy Management in Autonomous Microgrid using Stability-Constrained Droop Control of Inverters; Department of Electrical and Electronic Engineering, Imperial College London, UK; 14 pages.

Taghizadeh, et al.; Frequency Control in an Isolated Network with Optimized Droop Controller Using PSO Algorithm; Journal of Basic and applied Scientific Research, 3(1s) 596-602, 2013; ISSN 2090-4304.

* cited by examiner

DC VOLTAGE BROWNOUT PROTECTION FOR PARALLEL-CONNECTED FUEL-CELL POWER PLANTS IN ISLANDED MODE

BACKGROUND

Power supply networks typically include a main grid provided by a utility company. Some power supply networks include additional power supplies from alternative energy sources such as fuel cell power plants. At times, the supplemental distributed power supplies may operate in an islanded mode when the utility or main grid is disconnected or unavailable. Under those circumstances, the supplemental power supply devices provide all power required by one or more loads.

When fuel cell power plants are used in power supply networks, there is a possibility for one or more of the fuel cell power plants to experience a DC voltage brownout. This occurs, for example, when the operation of the cell stack assembly of an affected fuel cell power plant experiences fuel or oxygen starvation, low operating temperatures, or problems with coolant distribution. During brownout conditions, the fuel cell power plant may not be able to provide the output required on the power supply network for the current load demand. Fuel cell power plants that include multi-stage power electronic interfaces with a DC/DC converter are able to step up the output voltage by controlling the output voltage of the DC/DC converter. DC/DC converters can be employed to step up the output voltage of a cell stack assembly until the DC-link voltage is brought back to a desired level during voltage brownout conditions.

Other fuel cell power plants, however, have a single-stage power electronic interface topology and addressing DC brownout conditions for such fuel cell power plants in an islanded mode is more challenging.

SUMMARY

An illustrative example fuel cell power plant includes a cell stack assembly having a plurality of fuel cells, a single stage convertor configured to couple the cell stack assembly to a power network, and a controller that is configured to determine whether the fuel cell power plant has a DC voltage brownout condition during an islanded mode of operation and adjust a frequency droop gain of the fuel cell power plant to change a power output from the power plant during the DC voltage brownout condition. The controller adjusts the frequency droop gain while satisfying at least three criteria of a set of criteria consisting of (i) avoiding overloading other fuel cell power plants of the power network, (ii) avoiding exceeding a maximum load step-up capability of the power network, (iii) avoiding exceeding a maximum load step-up capability of the fuel cell power plant, (iv) maintaining a system frequency within an acceptable frequency range, and (v) avoiding repeating the DC voltage brownout condition.

In an example embodiment having one or more features of the fuel cell power plant of the previous paragraph, the three criteria are the criteria (i), (ii), (iv).

In an example embodiment having one or more features of the fuel cell power plant of any of the previous paragraphs, the controller is configured to adjust the frequency droop gain while satisfying at least four criteria of the set of criteria.

In an example embodiment having one or more features of the fuel cell power plant of any of the previous paragraphs, the at least four criteria include the criteria (i), (ii), and (iv) and at least one of the criteria (iii) or (v).

In an example embodiment having one or more features of the fuel cell power plant of any of the previous paragraphs, the controller is configured to adjust the frequency droop gain while satisfying all five of the criteria.

An illustrative example method of controlling a power output of a fuel cell power plant having a cell stack assembly and a single stage converter configured to couple the cell stack assembly to a power network, includes determining whether the fuel cell power plant has a DC voltage brownout condition, and adjusting a frequency droop gain of the fuel cell power plant to change the power output from the fuel cell power plant during the DC voltage brownout condition while satisfying at least three criteria of a set of criteria consisting of (i) avoiding overloading other fuel cell power plants of the power network, (ii) remaining below a maximum load step-up capability of the power network, (iii) remaining below a maximum load step-up capability of the fuel cell power plant, (iv) maintaining a power frequency within an acceptable frequency range, and (v) avoiding repeating the DC voltage brownout condition.

In an example embodiment having one or more features of the method of the previous paragraph, the at least three criteria are the criteria (i), (ii) and (iv).

An example embodiment having one or more features of the method of any of the previous paragraphs includes adjusting the frequency droop gain while satisfying at least four criteria of the set of criteria.

In an example embodiment having one or more features of the method of any of the previous paragraphs, the at least four criteria include the criteria (i), (ii) and (iv) and at least one of the criteria (iii) or (v).

An example embodiment having one or more features of the method of any of the previous paragraphs includes adjusting the frequency droop gain while satisfying all five of the criteria.

An illustrative example power supply system includes a plurality of fuel cell power plants in parallel to each other, the fuel cell power plants collectively providing a power output required by a load. A plurality of single phase converters are each associated with a respective one of the fuel cell power plants. The single phase converters are configured to couple the respective fuel cell power plant to at least one power distribution line. A plurality of controllers are each associated with a respective one of the fuel cell power plants. Each controller is configured to determine whether the respective fuel cell power plant has a DC voltage brownout condition and adjust a frequency droop gain of the respective fuel cell power plant to change a portion of the power output required from the respective fuel cell power plant during the DC voltage brownout condition while satisfying at least three criteria of a set of criteria consisting of (i) avoiding overloading others of the plurality of fuel cell power plants, (ii) remaining below a maximum load step-up capability of the power supply system, (iii) remaining below a maximum load step-up capability of the respective fuel cell power plant, (iv) maintaining a power frequency within an acceptable frequency range, and (v) avoiding repeating the DC voltage brownout condition.

In an example embodiment having one or more features of the power supply system of the previous paragraph, the at least three criteria are the criteria (i), (ii) and (iv).

In an example embodiment having one or more features of the power supply system of any of the previous paragraphs, the controller is configured to adjust the frequency droop gain while satisfying at least four criteria of the set of criteria.

In an example embodiment having one or more features of the power supply system of any of the previous paragraphs, the at least four criteria include the criteria (i), (ii) and (iv) and at least one of the criteria (iii) or (v).

In an example embodiment having one or more features of the power supply system of any of the previous paragraphs, the controller is configured to adjust the frequency droop gain while satisfying all five of the criteria.

Various features and advantages of at least one disclosed example embodiment will become apparent to those skilled in the art from the following detailed description. The drawings that accompany the detailed description can be briefly described as follows.

DETAILED DESCRIPTION

Embodiments of this invention provide DC voltage brownout protection for fuel cell power plants operating in an islanded mode. A frequency droop gain of the power plant is adjusted to address the brownout condition while satisfying multiple criteria to achieve dynamic adjustment while protecting the fuel cell power plants of the power supply network.

Figure 1:
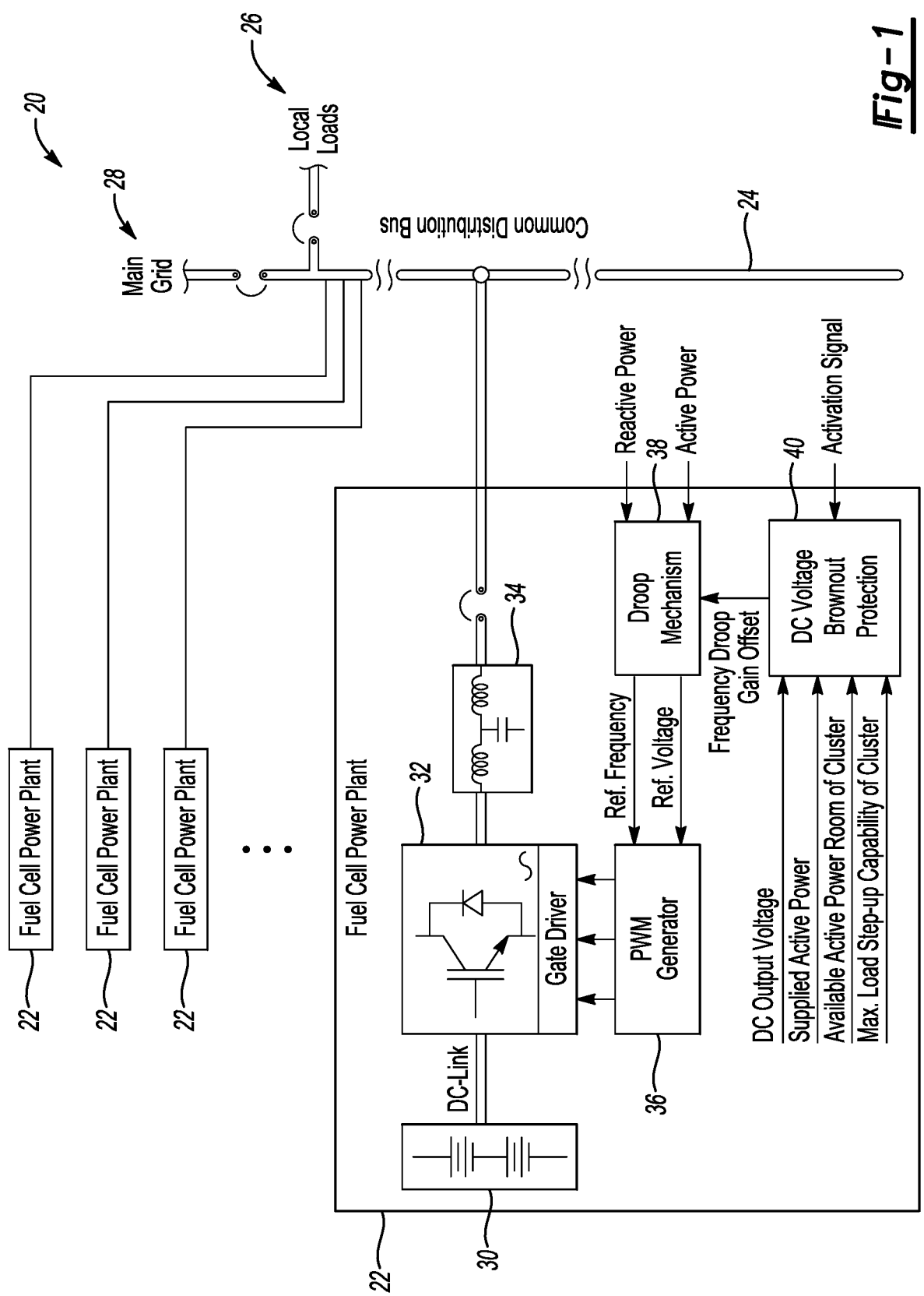
FIG. 1 schematically illustrates an example power supply system including DC brownout protection and droop control designed according to an embodiment of this invention.

FIG. 1 schematically illustrates a power supply system 20 including a plurality of fuel cell power plants 22 that are connected to at least one power distribution line 24. The fuel cell power plants 22 collectively establish a power supply network. The fuel cell power plants 22 supply power to loads represented at 26. A main grid 28 provided by a utility company, for example, also provides power to the loads 26. Under some conditions, the main grid 28 will be disconnected or unavailable and the fuel cell power plants 22 operate in an islanded mode as the only power source for the loads 26.

One of the fuel cell power plants 22 is shown in more detail than the others in FIG. 1. Each of the power plants 22 in the illustrated example are configured to have the features represented in FIG. 1. Each power plant 22 includes a cell stack assembly 30 including a plurality of fuel cells that operate in a known manner to generate electricity based on an electrochemical reaction. A DC-AC convertor 32 is a single-stage power electronic interface for the power plant 22. A filter 34 is provided for establishing the connection between the power plant 22 and the power distribution line 24.

The DC-AC convertor 32 is controlled by a pulse with modulation generator 36 that operates responsive to a droop control module 38. Controlling the frequency droop of the power plant 22 provides control over the active power supplied by the power plant 22 to the loads 26. Adjusting the frequency droop gain provides control over the current and the active power output by the power plant 22.

In the illustrated example embodiment the droop control module 38 adjusts the amount of power flow for each DC-AC converter 32 by regulating the frequency and output voltage of the respective DC-AC converter 32. This example includes linear negative feedback in the frequency and output voltage of each DC-AC converter 32 through the following relationships:

$$f_i = f_{ref} - k_{p,i} P_i \qquad (1)$$

and $$E_i = E_{ref} - k_{q,i} Q_i \qquad (2)$$

where $P_i$ and $Q_i$ are the output active and reactive power of the $i^{th}$ source. The parameters $f_{ref}$ and $E_{ref}$ are the reference frequency and voltage values, respectively and $k_{p,i}$ and $k_{q,i}$ are the frequency and voltage droop coefficients, respectively. While $f_{ref}$ and $E_{ref}$ are set as global values, $k_{p,i}$ and $k_{q,i}$ droop coefficients are determined as fixed values for each source based on its power rating. Since the frequency is a universal signal over the power network, the frequencies of all participating sources operating at steady state are equal to the operating frequency as $f_i = f_{opt}$, wherein i=1, 2, . . . , $N_s$ for a power network including $N_s$ number of sources. The amount of the frequency droop in each source is the same at steady state operation and described by $$k_{p,1} P_1 = k_{p,2} P_2 = \ldots = k_{p,N_s} P_{N_s} \qquad (3).$$

The droop control module 38 is configured to perform precise proportional active power sharing among participating power plants 22 by selecting the respective $k_{p,i}$ values based on the active power ratings of each of those sources. The droop control module 38 uses a frequency droop coefficient for each power plant 22 to achieve active power generation in proportion to the respective power ratings of the power plants 22. The frequency droop coefficient may be described as $$k_{p,i} = \delta f_{max} / P_i^{max} \qquad (4)$$

where $P_i^{max}$ is the maximum available power of the $i^{th}$ power plant 22 and $\delta f_{max}$ is the maximum acceptable frequency deviation in the network in an islanded mode. The $\delta f_{max}$ value is, for example, around 2% of the rated frequency and is taken into consideration to limit the frequency deviation at $P_i^{max}$.

A DC voltage brownout protection module 40 dynamically adjusts the frequency droop gain to adjust the amount of power output by the fuel cell power plant 22 during a brownout condition. In the illustrated example embodiment, the module 40 introduces a frequency droop gain offset so that the frequency droop gain is expressed as $$k_{p,i} = k_{x,i} + \delta k_{p,i} \qquad (5)$$

where $k_{x,i}$ is the fixed frequency droop gain that is determined from frequency droop equation (4) above and $\delta k_{p,i}$ is the frequency droop gain offset whose initial value is zero and dynamically adjusted a DC voltage brownout issue occurs in a power plant 22 during an islanded mode of operation.

Figure 2:
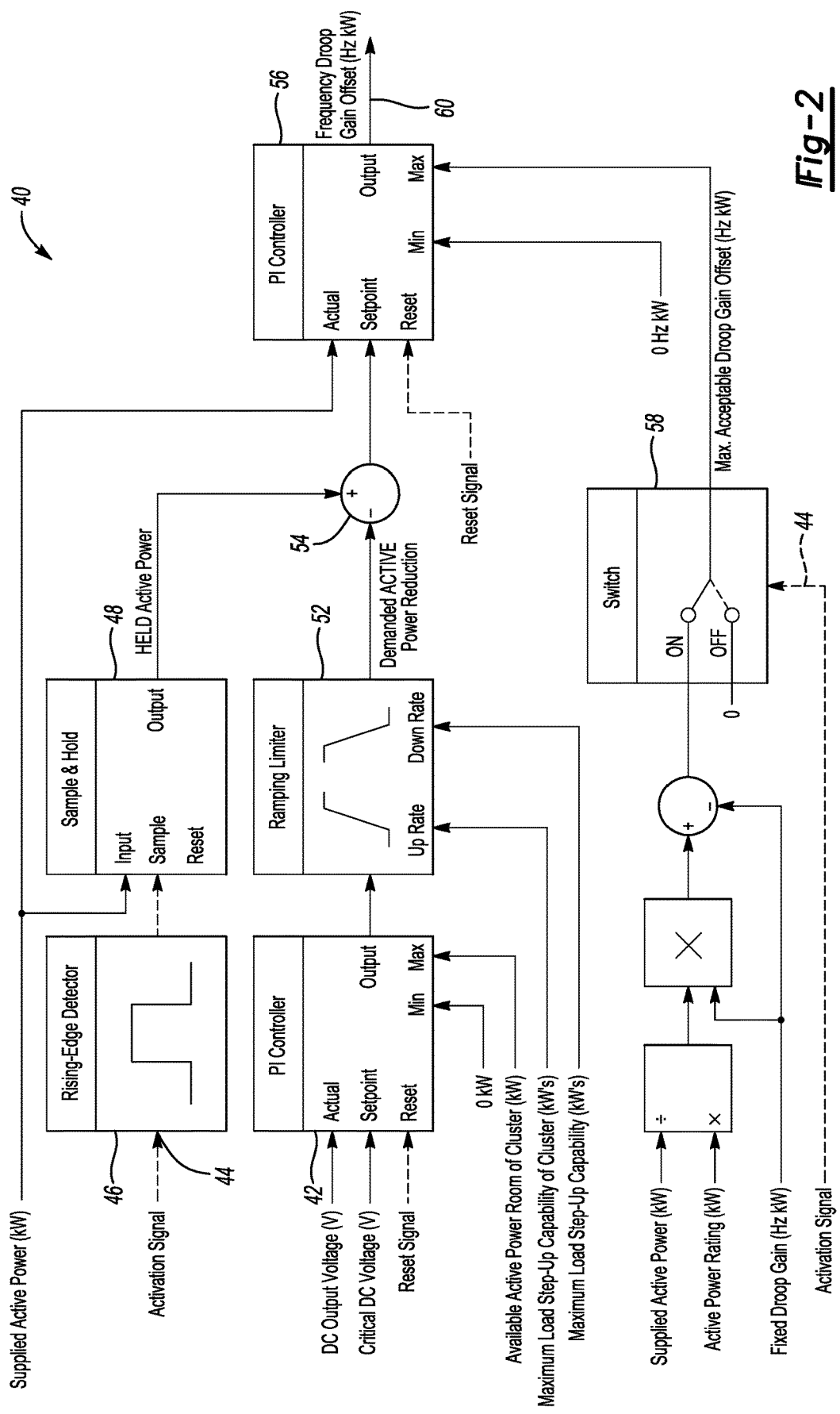
FIG. 2 schematically illustrates a DC brownout protection controller designed according an embodiment of this invention.

FIG. 2 schematically represents an example embodiment of a DC voltage brownout protection module 40. A PI controller 42 monitors a DC output voltage of the cell stack assembly 30 and compares that to a set point or critical DC voltage value, which is determined based on the minimum DC voltage level required by DC/AC inverters 32 to maintain the necessary coupling with the power distribution line 24. Each of the fuel cell power plants 22 provides a minimum power output at the DC link of the respective cell stack assemblies 30 to satisfy the overall power demand of the loads 26. In the illustrated example embodiment, the fuel cell power plants 22 may have different power ratings and the amount of power provided by each in an islanded mode of operation is proportional to their respective power ratings. For example, when all of the power plants 22 have the same power rating, the droop gain of each is set so that they all supply the same amount of power. In other embodiments where at least one of the power plants has a higher power rating than another, the respective droop gains are set such that the power plant with the higher rating provides a larger portion of the total power associated with the load demand.

When the DC output voltage from the cell stack assembly 30 falls below the critical DC voltage level a brownout condition at that power plant is generated. In case of a brownout condition, the associated power plant controller provides an activation signal at 44 to a rising edge detector 46. At the rising edge of the output signal from the rising edge detector 46 a sample and hold module 48 is triggered to sample and hold the currently supplied active power from the fuel cell power plant 22 under a brownout condition.

Based on the dynamically changing DC output voltage and set critical DC voltage, the PI controller 42 provides a control signal to a ramping limiter 52. The control signal from the PI controller 42 controls a rate at which the power output of the power plant 22 will change in response to the detected brownout condition. The output from the PI controller 42 operates as an error correction. The output increases as the DC output from the cell stack assembly 30 decreases for bringing the DC link voltage back above the critical DC voltage value. The output from the PI controller 42 is based in part on the available active power room of the network of fuel cell power plants 22. The output of PI controller 42 is limited to the available active power room of the network 20 of fuel cell power plants 22 so that the fuel cell power plants 22 will not experience overloading. Since at least one of the power plants 22 is experiencing a brownout, others of the power plants 22 have to increase their respective power outputs to make up for the inability of the power plant experiencing the brownout to satisfy its minimum DC link voltage. This satisfies one criterion of a set of criteria used during DC voltage brownout protection when the power supply system 20 is operating in an islanded mode.

The up-rate value of the ramping limiter 52 is dynamically adjusted such that the maximum load step-up capability of the power supply system 20 will not be exceeded. This satisfies another one of the criteria during DC voltage brownout detection. The down-rate value of the ramping limiter is set to the maximum load step-up capability of the fuel cell power plant that experienced the brownout. This satisfies another criteria of the set that govern how to conduct DC voltage brownout protection.

The output of the ramping limiter module 52 during a brownout is based in part on a maximum load step-up capability of the network 20 of power plants 22. The maximum load step-up capability of the network of power plants 22, provides a protective limit on the rate of change at any of the power plants 22 during the brownout.

The ramping limiter module 52 also controls changes in the power output of the power plant 22 that experienced the brownout after the brownout condition has dissipated or been resolved. Under those conditions, a maximum load step-up capability or of the individual power plant places a protective limit on the output from the ramping limiter module 52.

The held active power from the sample and hold module 48 and the power change output from the ramping limiter module 52 are combined at 54 and provided to a second PI controller 56 as a power output set point. Based on the set point input and actual output power values the second PI controller 56 adjusts its output control signal, which is a frequency droop gain offset. Another feature of the DC voltage brownout protection module 40 is that the activation signal 44 triggers the operation of a switch 58 that operates to ensure that the second PI controller 56 provides an output at 60 for dynamically adjusting the frequency droop gain of the power plant 22 that will maintain the frequency of the network of power plants 22 within an acceptable frequency value range. The switch 58 operates based on a supplied active power, active power rating, and pre-determined or fixed droop gain inputs. The output from the switch 58 effectively sets a maximum acceptable droop gain offset for dynamically adjusting the droop gain value to control the power output from the power plant 22.

The output at 60 from the second PI controller 56 is a droop gain offset that changes the droop gain of the droop control mechanism 38 for adjusting the power output.

Figure 3:
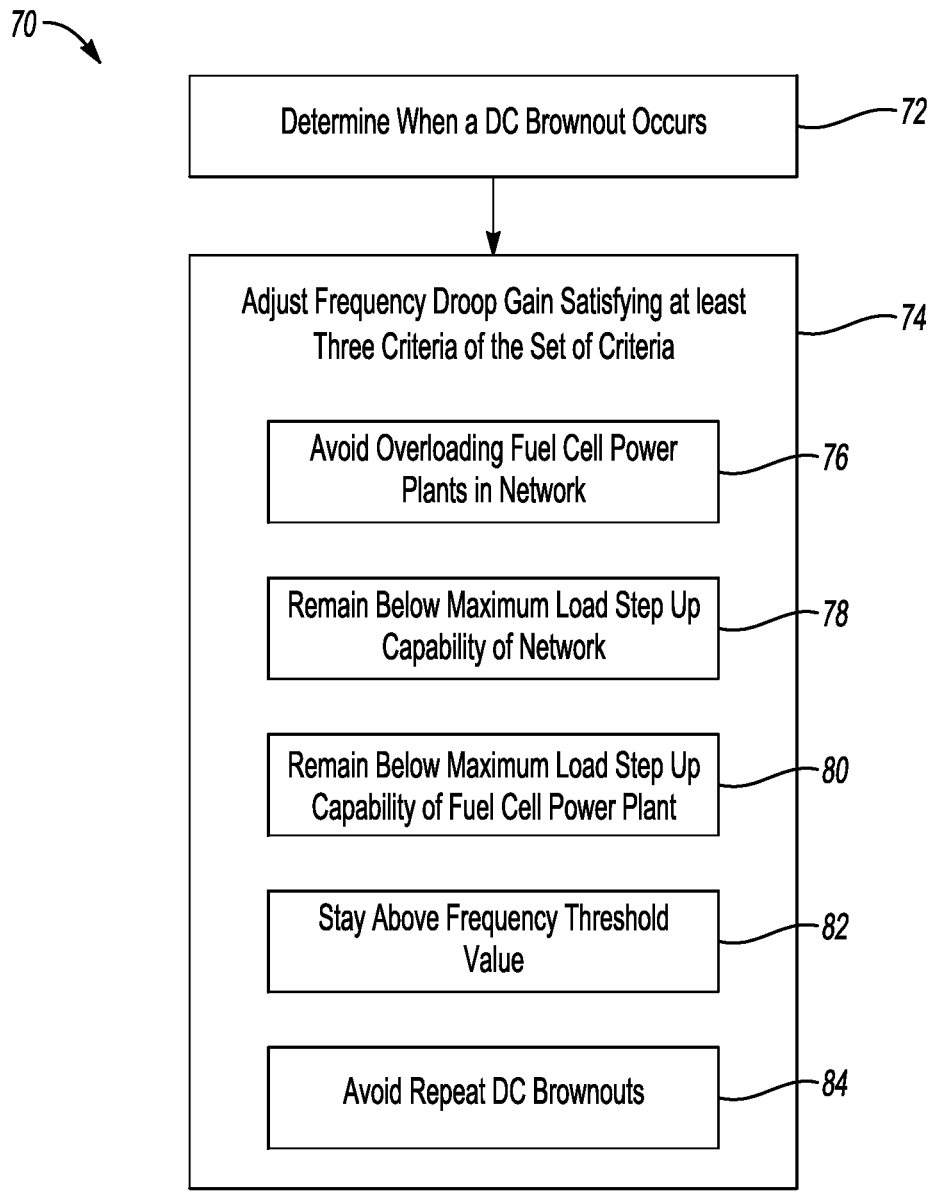
FIG. 3 is a flow chart diagram summarizing an example droop control method designed according to an embodiment of this invention.

FIG. 3 is a flow chart diagram 70 that summarizes an example droop gain adjustment method. In this example, the DC voltage brownout protection module 40 and the droop control mechanism 38 collectively operate as a controller that performs the method summarized in FIG. 3. A determination when a DC brownout occurs at 72 based on the DC link voltage of the associate power plant 22. At 74, the frequency droop gain is adjusted while satisfying a set of criteria. The set of criteria in this example includes avoiding overloading any of the fuel cell power plants 22 in the network as indicated at 76. Another criterion includes remaining below a maximum load step-up capability of the network as indicated at 78. A third criterion at 80 includes remaining below the maximum load step-up capability of the fuel cell power plant that experienced the brownout condition. This criterion is particularly useful in circumstances after recovery from a brownout condition when the power output of a power plant 22 is increasing back to a level corresponding to a properly operating power plant without brownout.

Another criterion is shown at 82 and that involves staying above the frequency threshold value described above. The last criterion of this example is shown at 84 and it includes avoiding repeat DC brownouts. There will be circumstances when the factors causing a brownout for one of the power plants 22 are not resolved and the DC brownout condition may repeatedly occur. Under such circumstances, the controller will adjust the frequency droop gain in a way that keeps the repeatedly browning out power plant at a low active power and the other power plants will compensate by providing increased power outputs on a more consistent or long-term basis.

In this example, the controller is configured or programmed to prefer or place more importance on satisfying the criteria shown at 76, 78, and 82.

In other example embodiments, the controller is configured to satisfy at least four of the criteria. In such examples, the controller may be configured to adjust the frequency droop gain while satisfying the criteria shown at 76, 78, and 82 while also satisfying at least one of the criteria shown at 80 and 84.

Other embodiments include a controller that always ensures that all five of the example criteria are satisfied while adjusting the frequency droop gain to change the power output of the power plant 22.

While not specifically illustrated, a network controller provides information to the DC voltage brownout protection module 40 regarding the available active power room for the network 22 and the maximum load change threshold or the maximum load step-up capability of the network 22. The network controller, however, need not determine any adjustments to the frequency droop gain or power output of any of the power plants 22 as those adjustments are made by the individual DC voltage brownout protection modules 40 associated with each power plant 22.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A fuel cell power plant, comprising:
a cell stack assembly including a plurality of fuel cells;
a single stage converter configured to couple the cell stack assembly to a power network; and
a controller configured to
determine whether the fuel cell power plant has a DC voltage brownout condition, and
adjust a frequency droop gain of the fuel cell power plant to change a power output from the fuel cell power plant during the DC voltage brownout condition while satisfying at least three criteria of a set of criteria consisting of
(i) avoiding overloading other fuel cell power plants of the power network,
(ii) remaining below a maximum load step-up capability of the power network,
(iii) remaining below a maximum load step-up capability of the fuel cell power plant,
(iv) maintaining a power frequency within an acceptable frequency range, and
(v) avoiding repeating the DC voltage brownout condition.

2. The fuel cell power plant of claim 1, wherein the at least three criteria are the criteria (i), (ii) and (iv).

3. The fuel cell power plant of claim 1, wherein the controller is configured to adjust the frequency droop gain while satisfying at least four criteria of the set of criteria.

4. The fuel cell power plant of claim 3, wherein the at least four criteria include the criteria (i), (ii) and (iv) and at least one of the criteria (iii) or (v).

5. The fuel cell power plant of claim 1, wherein the controller is configured to adjust the frequency droop gain while satisfying all five of the criteria.

6. A method of controlling a power output of a fuel cell power plant including a cell stack assembly and a single stage converter configured to couple the cell stack assembly to a power network, the method comprising:
determining whether the fuel cell power plant has a DC voltage brownout condition, and
adjusting a frequency droop gain of the fuel cell power plant to change the power output from the fuel cell power plant during the DC voltage brownout condition while satisfying at least three criteria of a set of criteria consisting of
(i) avoiding overloading other fuel cell power plants of the power network,
(ii) remaining below a maximum load step-up capability of the power network,
(iii) remaining below a maximum load step-up capability of the fuel cell power plant,
(iv) maintaining a power frequency within an acceptable frequency range, and
(v) avoiding repeating the DC voltage brownout condition.

7. The method of claim 6, wherein the at least three criteria are the criteria (i), (ii) and (iv).

8. The method of claim 6, comprising adjusting the frequency droop gain while satisfying at least four criteria of the set of criteria.

9. The method of claim 8, wherein the at least four criteria include the criteria (i), (ii) and (iv) and at least one of the criteria (iii) or (v).

10. The method of claim 6, comprising adjusting the frequency droop gain while satisfying all five of the criteria.

11. A power supply system, comprising:
a plurality of fuel cell power plants in parallel to each other, the fuel cell power plants collectively providing a power output required by a load;
a plurality of single phase converters that are each associated with a respective one of the fuel cell power plants, the single phase converters being configured to couple the respective fuel cell power plant to at least one power distribution line; and
a plurality of controllers that are each associated with a respective one of the fuel cell power plants, each controller being configured to
determine whether the respective fuel cell power plant has a DC voltage brownout condition; and
adjust a frequency droop gain of the respective fuel cell power plant to change a portion of the power output required from the respective fuel cell power plant during the DC voltage brownout condition while satisfying at least three criteria of a set of criteria consisting of
(i) avoiding overloading others of the plurality of fuel cell power plants,
(ii) remaining below a maximum load step-up capability of the power supply system,
(iii) remaining below a maximum load step-up capability of the respective fuel cell power plant,
(iv) maintaining a power frequency within an acceptable frequency range, and
(v) avoiding repeating the DC voltage brownout condition.

12. The power supply system of claim 11, wherein the at least three criteria are the criteria (i), (ii) and (iv).

13. The power supply system of claim 11, wherein the controller is configured to adjust the frequency droop gain while satisfying at least four criteria of the set of criteria.

14. The power supply system of claim 13, wherein the at least four criteria include the criteria (i), (ii) and (iv) and at least one of the criteria (iii) or (v).

15. The power supply system of claim 11, wherein the controller is configured to adjust the frequency droop gain while satisfying all five of the criteria.

* * * * *